United States Patent [19]

Roney

[11] 4,020,695
[45] May 3, 1977

[54] METHOD AND APPARATUS FOR MEASUREMENT OF SURFACE TEMPERATURE

[75] Inventor: John E. Roney, Monroeville, Pa.

[73] Assignee: Jones & Laughlin Steel Corporation, Pittsburgh, Pa.

[22] Filed: Jan. 7, 1976

[21] Appl. No.: 647,190

Related U.S. Application Data

[63] Continuation-in-part of Ser. No. 614,696, Sept. 18, 1975, abandoned.

[52] U.S. Cl. .............................. 73/355 EM; 356/43; 356/118
[51] Int. Cl.$^2$ ..................... G01J 5/06; G01N 21/40
[58] Field of Search .................. 73/355 R, 355 EM; 356/46, 48, 118, 43

[56] References Cited

UNITED STATES PATENTS

| 3,422,678 | 1/1969 | Murray ..................... 73/355 EM X |
| 3,462,224 | 8/1969 | Woods et al. ............ 73/355 EM X |
| 3,791,635 | 2/1974 | Schwestka .................... 73/355 EM |

Primary Examiner—Richard C. Queisser
Assistant Examiner—John S. Appleman
Attorney, Agent, or Firm—Buell, Blenko & Ziesenheim

[57] ABSTRACT

The temperature of a metal surface is measured by positioning a radiation detector so that the angle between its optical axis and a line normal to the surface is equal to the principal angle of incidence of the radiation emitted by the surface and interposing a polarizer between surface and radiation detector adjusted to pass only radiation polarized parallel to the plane of emittance. In this way the effects of emissivity variations of the surface are greatly reduced.

2 Claims, 2 Drawing Figures

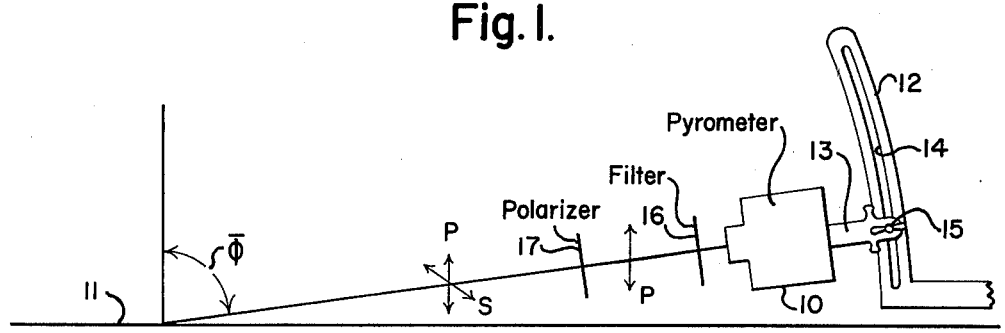
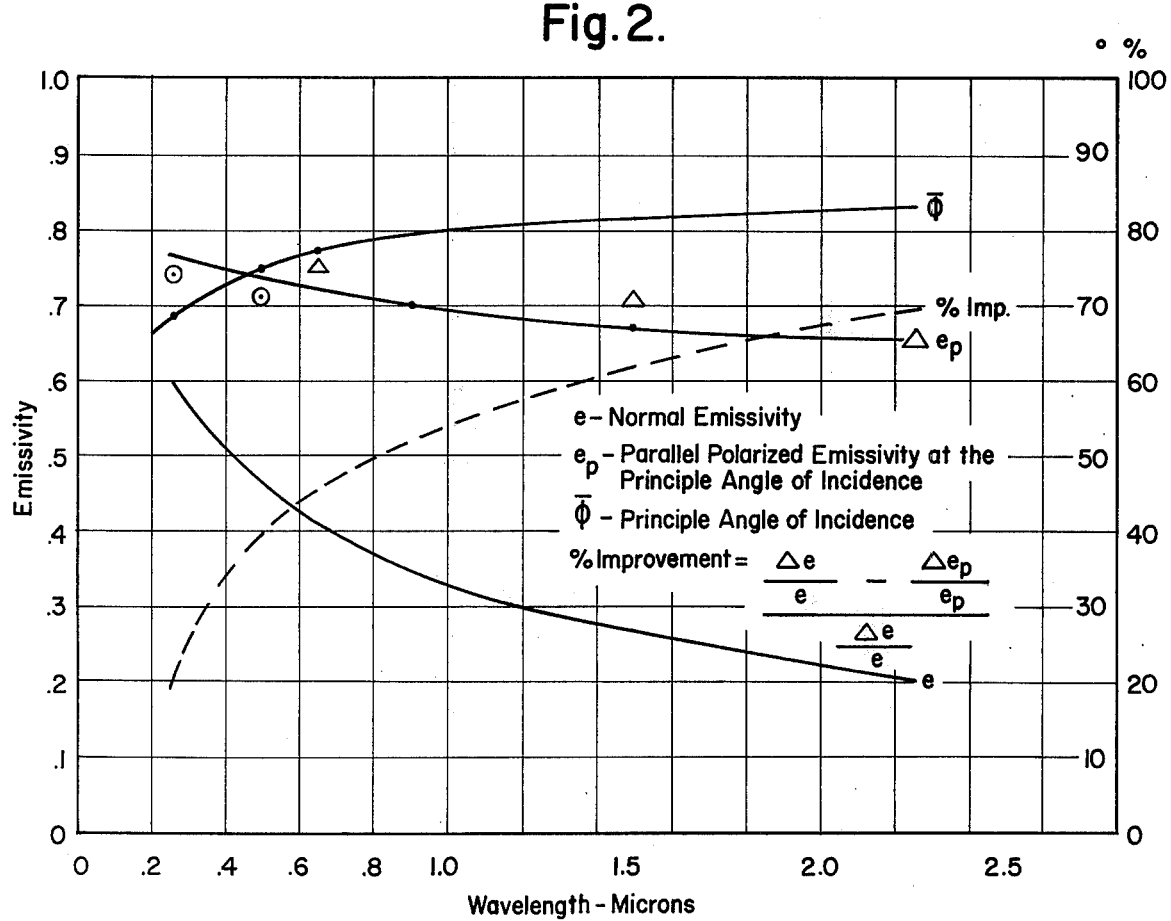
Normal & Parallel Polarized Emissivity of Steel vs. Wavelength

METHOD AND APPARATUS FOR MEASUREMENT OF SURFACE TEMPERATURE

This application is a continuation-in-part of application Ser. No. 614,696, filed Sept. 18, 1975, abandoned.

This invention relates to method of and apparatus for the measurement of temperature of a radiating metal surface. It is more particularly concerned with more precise measurement of temperature of hot metal surfaces achieved by minimization of the effects of emissivity variations.

Radiation pyrometers are widely used for the measurement of the temperature of hot objects to which thermocouples cannot be readily affixed. One class of such objects comprise objects in motion, or objects being deformed by hot working, such as metal in the course of its manufacture. Hot metals are not black bodies. The precision of radiation pyrometer temperature measurement of such metals depends on the precision with which the emissivity of the metal surface is known. It happens, however, that the emissivity of a hot metal surface varies markedly with variations in the wave length of the radiation emitted, decreasing with increase in the wave length. The emissivity of a surface also varies with the relative roughness of the surface, and is affected by the presence of foreign material such as scale, dirt and so forth on the hot surface. In radiation pyrometry, therefore, it is necessary to compensate or account in some way for the unavoidable variations in the emissivity of the surface being measured.

The prior art has proposed various solutions to this problem. For example, U.S. Pat. No. 2,690,078, titled Radiation Temperature Measurement, issued to W. E. Phillips, Jr. on Sept. 28, 1954, discloses method and apparatus including a reflecting surface positioned at a relatively low angle to the surface being measured so as to produce a multiplicity of reflections of radiant energy between the reflector and the work surface. This reflection adds a reflected component to the radiation emitted from the work surface, so as to bring the total effective radiation falling on the radiation detector close to the black body value.

A number of prior art investigators have based their work on the assumption, which is supported by theoretical considerations, that when a radiation detector is sighted alternately on a heated black body and on the thermal radiations of that body reflected by the surface to be measured, a null will occur only when the work surface and the black body are at the same temperature. Method and apparatus of that nature are disclosed in U.S. Pat. No. 3,492,869 titled Means of Measuring Surface Temperature by Reflection, issued on Feb. 3, 1970 to Hiromichi Toyota et al.

Other investigators have proceeded by measuring the reflectivity of the work surface and changing the reflectivity signal into an emissivity signal, which is then used to convert the radiation signal into a temperature indication. Apparatus of this type is disclosed in U.S. Pats. No. 3,433,052, titled Material Tester, issued Mar. 18, 1969, and U.S. Pat. No. 3,451,254 titled Non-Destructive Tester, issued June 24, 1969, both to Dale R. Maley.

The devices and procedures of the prior art exemplified by those above mentioned are rather complicated, and not well adapted to production control in metal-working plants. The Phillips patent requires the reflector to be placed close to the work, and the first Maley patent requires a controlled source of radiation, positioned close to the measured surface. It is an object of my invention to provide apparatus and process for such temperature measurement which can be readily used in the plant or factory. It is another object to provide apparatus of little bulk and without moving parts which does not require a part of the apparatus to be close to the measured surface. It is another object to provide a process which, after an initial setting, requires no manipulative steps on the part of the observer. Other objects of my invention will appear in the description thereof which follows:

I have found that by measuring only the polarized component of emitted radiation that is parallel to the plane of emittance, that is to say parallel to a plane perpendicular to the surface to be measured, and which is emitted at an angle to a perpendicular to the surface equal to the principle angle of incidence of reflected radiation, the effects of emissivity variations of the surface on the measurement are greatly reduced. The relative improvement in measurement precision so obtained is greater the longer the wave length of the band of radiation selected.

Some prior investigators have used polarized radiation in radiation temperature measurement. U.S. Pat. No. 3,462,224 titled Polarization Pyrometer, issued to W. W. Woods et al. on Aug. 19, 1969, discloses apparatus somewhat similar to that of the Toyota et al. patent previously mentioned, but in which polarizing means are positioned in front of the radiation measuring device and including apparatus to balance signals of the two polarized radiation components. U.S. Pat. No. 3,422,678 titled, Apparatus and Method for Measuring Temperatures, issued to Thomas P. Murray on Jan. 21, 1969, discloses apparatus and method of the same general type.

An embodiment of the apparatus of my invention presently preferred by me is illustrated in the attached figures, to which reference is now made.

FIG. 1 is a diagrammatic sketch of the arrangement of the apparatus of my invention with respect to the surface to be measured.

FIG. 2 is a graph of certain optical constants of steel and of certain calculations therefrom which show the improvement in precision in temperature measurement made possible by my invention.

A pyrometer 10 capable of measuring radiant energy from a surface 11 is supported thereabove by an upright sector 12, to which it is adjustably connected by an arm 13. Sector 12 is formed with a central slot 14 and arm 13 is attached thereto by a bolt and wing nut 15 so that pyrometer 10 can be moved upwardly and downwardly along the sector while still remaining pointed at the same portion of work surface 11. Incorporated within the pyrometer or in front of the aperature of pyrometer 10 is positioned a filter 16 which selects the desired band of wave lengths from the energy radiated by work surface 11. This filter is not always needed because the lens and dector of the pyrometer may limit the wavelength band sufficiently. Interposed between the filter 16 and the work surface 11 is a polarizer 17 adjusted to pass only the component of radiation from surface 11 which is polarized parallel to the plane of emittance, which is the plane of the paper in FIG. 1. The position of pyrometer 10 is adjusted so that the angle between its optical axis and a line normal to surface 11 is equal to the principal angle of incidence of reflected radiation of the selected band of wave lengths.

The benefits of my invention arise because it increases the effective emissivity of metal surfaces and thus reduces the effect of emissivity variations on the precision of the pyrometer reading. Radiation from surface 11, reflected or emitted, may be considered to consist of two components, one component vibrating in the plane of the surface, the S component, and the other in a plane normal thereto, the P component. The principal angle of incidence, a term ordinarily applied to reflected radiation, is the angle of incidence for which the phase change between the two radiation components above mentioned is 90°. This principal angle is also the angle at which the apparent emissivity of the P component is a maximum. Radiation from surface 11 at the principal angle of incidence is polarized by polarizer 17 so that only the P component passes into the pyrometer 10.

Measurement of the P component alone increases the apparent emissivity because at the principal angle of incidence the reflectivity of that component is minimized. The P and S components are not equally reflected from a metal surface. Their reflection is a function of the wave length of the radiation, its angle of incidence, or emittance, and certain other constants which will be discussed hereinafter. By measuring the intensity of the P component only, at the angle of incidence which minimizes its reflectivity, I reduce to a minimum the effect on the measurement of variations in the emissivity of the surface.

The principal angle of incidence varies with the wave length of the radiation and it is thus better to select a band of radiation from the full spectrum radiated. The variation is not very rapid, and the width of the selected band is therefore not critical. If the principal angle of incidence is chosen as that of the wave length of radiation at the middle of the band, as I prefer to do, that angle of incidence will depart somewhat from the principal angle of incidence of the wave lengths at the edges of the band, and the increase in effective emissivity resulting will be slightly less the greater the band width.

The improved precision in temperature measurement brought about by my invention will be demonstrated hereinafter with particular reference to steel as the material of the surface to be measured. My invention is particularly well suited to certain operations in the steel industry, such as measurement of temperature in the continuous annealing of cold rolled steal strip in strand form, but it is also useful for other metals.

For radiation from opague surfaces, the well-known relation $e + r = 1$ applies, where e is the emissivity of the surface and r is its reflectivity. The equation also applies to the polarized components of the radiation, as follows:

$$e_p + r_p = 1$$

$$e_s + r_s = 1$$

$$\frac{\Delta e_p}{e_p} = \frac{\Delta(1 - r_p)}{1 - r_p} = -\frac{\Delta r_p}{1 - r_p}$$

Since $r_p$ varies only between zero and 1, the smaller the value of $r_p$ the less will be the effect of $r_p$ on the relative change in emissivity.

For example, if: $r_p = 0.3$ and $\Delta r_p = 0.05$, then $$\frac{\Delta e_p}{e_p} = \frac{-0.05}{1 - .3} = -7\%$$

If $r = 0.65$ and $\Delta r = 0.05$, then $$\frac{\Delta e}{e} = \frac{-0.05}{1 - .65} = -14\%$$

The first calculation above applies to the process of my invention as used to measure temperature of steel strip at a selected pyrometer wave length band centered at 0.9 microns, as will appear hereinafter. The second calculation applies to measurement of the temperature of steel strip by non-polarized radiation of the same wave length at normal incidence or emittance. The improvement in precision made possible by my invention is seen to be:

$$(14-7)/14 = 50\%$$

When longer wave lengths of radiation are used, the improvement is greater, for example with radiation of 2.5 microns wave length the improvement is 73%.

The values of $r_p$ and $r$ are calculated from the formulae: (Fundamentals of Physical Optics, Jenkins & White pages 400–401):

$$r_p = \frac{\left(u - \frac{1}{\cos\phi}\right)^2 + Ko^2}{\left(u + \frac{1}{\cos\phi}\right)^2 + Ko^2} \text{ and } r = \frac{(u-1)^2 + Ko^2}{(u+1)^2 + Ko^2}$$

The table below for various wave lengths of radiation tabulates in its first three columns optical constants for polished steel taken from the handbook of Chemistry & Physics, 44th Edition, 1969, pages 3084–86. In its remaining 5 columns it tabulates $r_p$, $e_p$, $r$, $e$, and the improvement brought about by my process, as calculated above. In the Handbook the extinction coefficient $Ko$ is tabulated as $nk$, the product of the refractive index and the absorption index.

$\bar{\phi}$ is the angle of incidence and $\phi$ is the principal angle of incidence.

| Wavelength Microns | $\bar{\phi}$ | u | Ko | $r_p$ | $e_p$ | r | e | Improvement |
|---|---|---|---|---|---|---|---|---|
| .257 | 68°35' | 1.38 | 1.86 | 0.26 | 0.74 | 0.40 | 0.60 | 19% |
| .500 | 75°47' | 2.09 | 3.14 | .29 | .71 | .57 | .43 | 40% |
| .650 | 77°48' | 2.70 | 3.59 | .25 | .75 | .59 | .41 | 45% |
| 1.50 | 81°48' | 3.71 | 5.75 | .296 | .70 | .73 | .27 | 62% |
| 2.25 | 83°22' | 4.14 | 7.41 | .345 | .655 | .80 | .20 | 69% |

In FIG. 2, the calculated values of $e$, $ep$, $\bar{\phi}$, and the improvement brought about by my process are graphed against wave length. The uppermost curve is that for the principal angle of incidence, the lowest is the curve for $e$, the curve for $e_p$ is directly below that for the principal angle of incidence, and the remaining curve is the curve for the improvement in precision made possible by my invention, calculated as set out above. It is evident that the improvement is relatively slight at short wave lengths, but increases rapidly as the wave lengths of the radiation reach about 1 micron and continues to improve to the longest wave investigated.

I have said that a band of radiation should be employed because the principal angle of incidence varies over the range of wave lengths tabulated and graphed herein. The various types of radiation detectors available for this range have restricted ranges, as those skilled in the art know, and the restrictions so provided may be sufficient. I have had good results with a detector having an effective wave length band of about 0.8 to 1.0 micron. Filters, of course, may be employed to modify further the received wave length band. The term "radiation detecting means responsive to a band of wave lengths from the radiation emitted by the surface" used hereinafter comprehends both detectors with inherently limited wave length range and detectors combined with filters to render them sensitive only over a restricted band of wave lengths.

In the foregoing specification I have described presently preferred embodiments of my invention; however, it will be understood that my invention can be otherwise embodied within the scope of the following claims.

I claim:

1. Pyrometer apparatus for metal surfaces comprising radiation detecting means responsive to a band of wave lengths from the radiation emitted by the surface, polarizing means interposed between the radiation detecting means and the surface, adjusted to selectively pass only radiation polarized parallel to the plane of emittance, and to suppress other radiation, the polarizing means being fixed in their place, and means for positioning the radiation detecting means so that the angle between its optical axis and a line normal to the surface is equal to the principal angle of incidence of the band of wave lengths.

2. The method of measuring the temperature of a radiating metal surface comprising polarizing radiation from the surface so as to produce a component parallel to the plane of emittance, and to suppress other radiation, maintaining constant the plane of polarization, and positioning a radiation detector so as to receive polarized radiation in the band of wave lengths to which the radiation detector responds emitted at an angle to a line normal to the surface equal to the principal angle of incidence of the band of wave lengths.

* * * * *

UNITED STATES PATENT OFFICE
CERTIFICATE OF CORRECTION

PATENT NO. : 4,020,695
DATED : May 3, 1977
INVENTOR(S) : JOHN E. RONEY

It is certified that error appears in the above-identified patent and that said Letters Patent are hereby corrected as shown below:

Column 4, line 55, $\bar{\emptyset}$ should read $\emptyset$ and $\emptyset$ should read $\bar{\emptyset}$ Signed and Sealed this ninth Day of August 1977

[SEAL]

Attest:

RUTH C. MASON
*Attesting Officer*

C. MARSHALL DANN
*Commissioner of Patents and Trademarks*